Jan. 13, 1948. F. H. SCHNEIDER 2,434,592
SELF-RAISING LID FOR USE WITH COOKING OVENS
Filed Sept. 9, 1944    2 Sheets-Sheet 1

Inventor:
Frank H. Schneider,
by C. Yardley Chittick
Attorney

Jan. 13, 1948. F. H. SCHNEIDER 2,434,592
SELF-RAISING LID FOR USE WITH COOKING OVENS
Filed Sept. 9, 1944 2 Sheets-Sheet 2

Inventor:
Frank H. Schneider,
by C. Yardley Chittick
Attorney

Patented Jan. 13, 1948

2,434,592

UNITED STATES PATENT OFFICE 2,434,592

SELF-RAISING LID FOR USE WITH COOKING OVENS

Frank H. Schneider, Gardner, Mass., assignor to Florence Stove Company, Gardner, Mass., a corporation of Massachusetts Application September 9, 1944, Serial No. 553,401

5 Claims. (Cl. 126—19)

This invention relates to cooking ovens, and is particularly concerned with a food covering lid which is self-raising to permit inspection or removal of the food when the cooking surface has been partially withdrawn from the oven.

The self-raising lid is used particularly in connection with a cooking surface supported by a structure which can be readily withdrawn from the oven. Such a structure may be slidably mounted in the oven or may be carried by rollers or other freely acting bearings which will make withdrawal somewhat easier.

In addition to the self-raising characteristics of the lid, it is also contemplated that the lid may be manually raised or may be withdrawn from the oven with the cooking surface without being raised at all. It is obvious that a lid which is self-raising will be of great assistance in permitting easy inspection of the food while it is being cooked, and, at the same time, will minimize the possibility of the operator being burned.

These and other advantages of the invention will appear more fully as the description proceeds with the aid of the accompanying drawings in which Fig. 1 is a front view of a cylindrical oven utilizing the invention.

Figure 1:
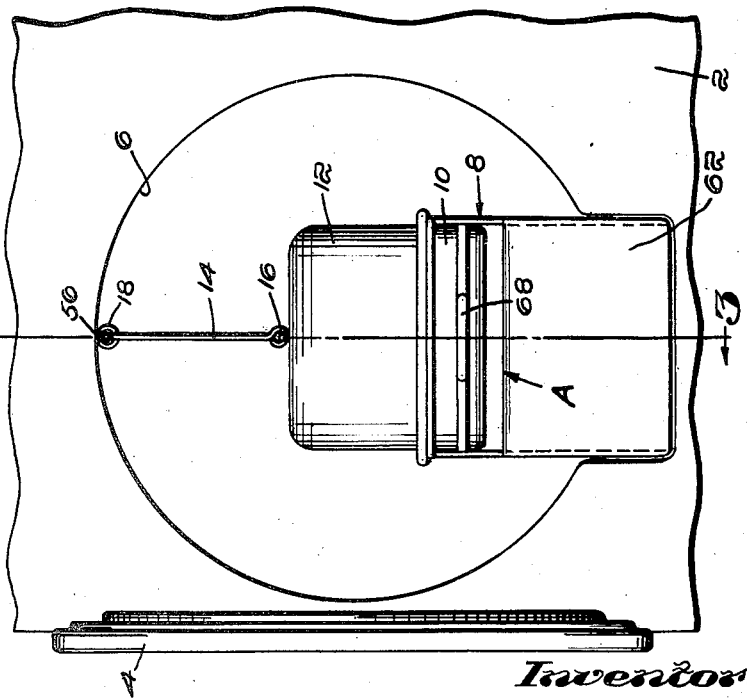

Referring to Fig. 1, there is shown in front view an oven 2 with a door 4 in open position. The oven interior is cylindrical as at 6, and supporting means for a cooking surface is shown generally at 8. The cooking surface, which may be a roasting pan or griddle, is at 10, and this is covered by a cover or lid 12. A link 14 is connected to the top of the lid at 16 and connected to the roof of the oven at 18.

Figure 3:
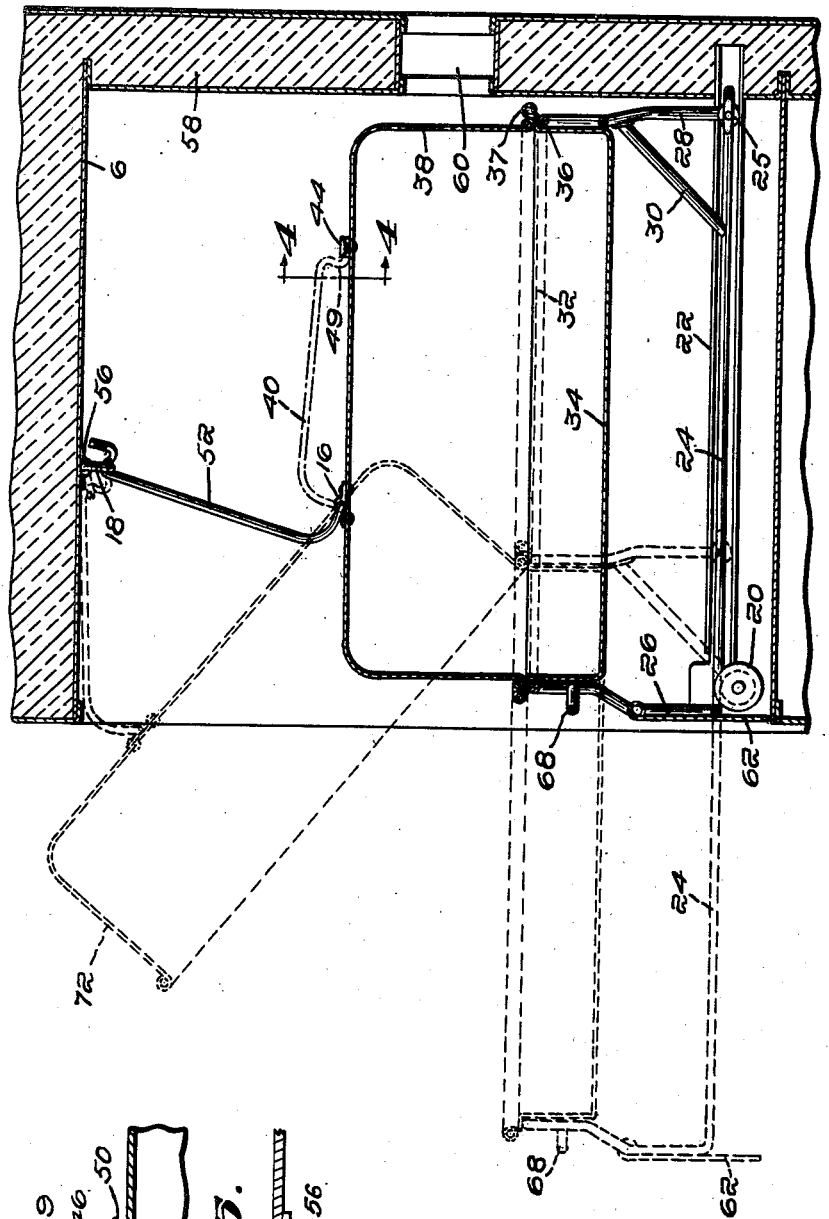
Fig. 3 is a vertical section on the line 3—3 of Fig. 1, showing the lid in normal position within the oven and in raised position when the cooking surface has been partially withdrawn.

The details of the construction in Fig. 1 are shown more clearly in Fig. 3. The supporting structure for the cooking surface consists of supporting rollers 20, which are positioned on either side of the opening at the front of the oven. A spaced pair of channels 22 extend lengthwise of the oven with their front ends close to the rollers 20. Horizontal supporting bars 24 carried at their front ends by rollers 20 are positioned close to the channel and have at their rear ends small rollers 25 which fit within the channels to provide support and ease of motion. As a result of this arrangement, bars 24 may be drawn outwardly from the oven to the position shown by the dotted lines. Extending upwardly from the front and rear ends of bars 24 are the vertical members 26 and 28 with the diagonal bracing members 30. This structure, in turn, supports a rectangular horizontal frame 32, which is adapted to carry a roasting pan 34 of suitable depth. The upper edge of the roasting pan is turned upwardly as at 36, terminating in a beaded edge 37, so that the entire circumference rests on the rectangular frame 32. It will be understood, of course, that a griddle could be substituted for the roasting pan if desired, and would be supported on frame 32 in the same manner. The roasting pan 34 or a griddle, if used, constitutes a cooking surface, and this cooking surface is in turn covered by lid 38 which rests on the outwardly extending lip 36 of the cooking surface as shown.

Figures 4, 5:
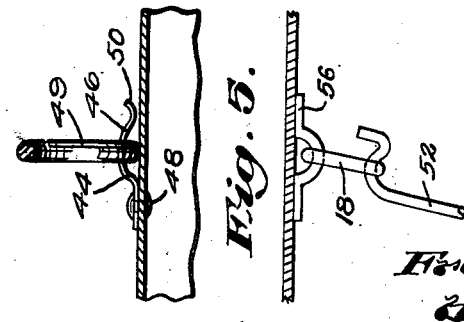
Fig. 4 is a section on the line 4—4 of Fig. 3, showing in detail the means for latching one end of the handle to the lid top.
Fig. 5 is an enlarged detail of the means for connecting the link to the oven roof.

On the top of lid 38 is the handle 40, shown in dotted lines. This handle is pivoted at its front end to the top of the lid at 16, and is secured at its back end by a spring snap 44. The details of this snap construction are shown in Fig. 4, in which there is a spring finger 46 secured to the lid top by a rivet 48 in such manner that the rear end 49 of the handle can be snapped sideways under the end 50 of the finger 46. When the handle is engaged by finger 46, the connection is sufficiently strong to permit lifting of the lid by the handle in the usual manner.

The length of handle 40 is particularly adjusted to the oven with which the lid is to be used. When the rear end of the handle is unsnapped from the position shown in Fig. 4 and from the dotted line position in Fig. 3, it may be swung upwardly to assume the full line position at 52 in Fig. 3. The upper end of the handle is then passed through an eye 18, where it is secure against downward and outward forces that may be exerted on the handle. The eye 18 is movably connected with the roof of the oven by the strap 56.

The oven itself is ordinarily insulated in the usual manner about its side and at the rear by the insulation material 58. In a typical construction, there will be a vent to the chimney as at 60. Heat is applied to the oven by a heat source positioned under the cooking surface, which heat source is not shown and constitutes no part of the present invention. The front of the oven is cut away at the bottom, and it is in this area that supporting structure is positioned. The supporting structure and the burner will ordinarily be protected from the outside by a vertical plate 62, which is attached to the supporting structure and moves outwardly with the supporting structure and the roasting pan when the latter units are withdrawn.

The operation of the self-raising lid is as follows: when the operator desires to examine the condition of the food or to remove it from the oven the door 4 is opened, and by grasping the handle 68 the entire framework that supports the cooking surface may be drawn forward out of the oven, as indicated by the dotted lines in Fig. 3. When this takes place the cooking surface and the covering lid, of course, are withdrawn with the supporting framework. However, since the top of the lid is connected to the oven top by the handle 52, it is obvious that as forward movement of the supporting framework proceeds, the front end of the lid will swing upwardly as the rear of the lid pivots about its line of engagement with the back edge of the cooking surface formed by the beaded edge 37. The result is that the lid assumes the dotted line position shown in Fig. 3 and indicated at 72. In this position there is adequate room for the operator to inspect or remove the food. Upon return of the supporting frame and cooking surface to the oven, the lid automatically returns to its closed position, as shown in the solid lines in Fig. 3.

It will be understood, of course, that there is no intention that the use of this automatically opening lid be limited to the particular supporting structure or the cooking surface shown in Figs. 1 and 3, nor is the invention limited to the ovens for heating or cooking foods.

Figure 2:
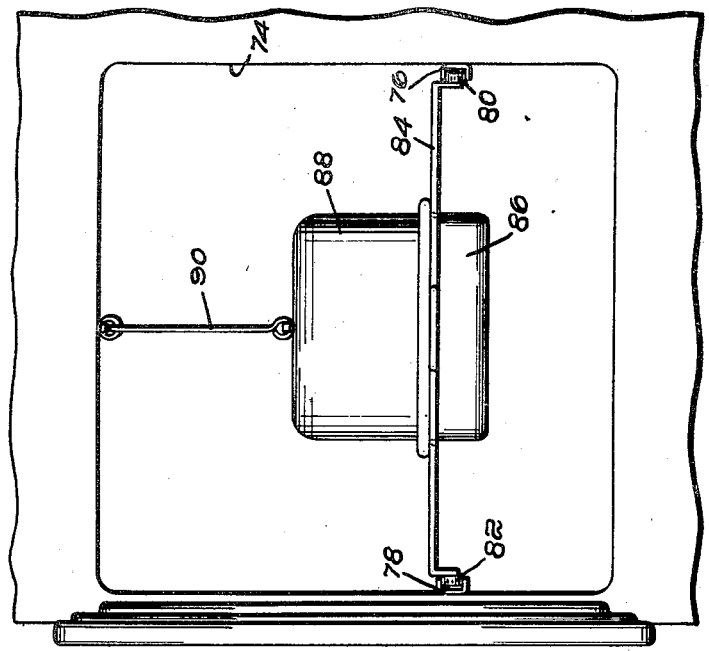
Fig. 2 is a front view of a conventional rectangular oven utilizing the invention.

Another form of support for the cooking surface is shown in Fig. 2, with which the lid may be used with equal facility. Here is disclosed a conventional rectangular oven 74, having at its sides a pair of horizontally extending supporting channels 76 and 78. These channels in turn have located therein a plurality of rollers 80 and 82, which support a transversely extending horizontal rack 84. This rack supports a cooking surface, such as a roasting pan 86 shown in Fig. 2. The details of the lid 88 in relation to the pan 86 are the same as the construction shown in Fig. 3. Similarly the link 90 connecting the cover top and the roof of the oven is the same as that previously described.

The operation of the construction of Fig. 2 is as follows: As the rack 84 is withdrawn from the oven, the lid 88 will gradually swing to a more and more open position. The opening is limited by either the connecting link 90 or the lid itself engaging some fixed part of the oven. In the construction shown the link itself strikes against the oven roof to limit further opening movement.

While it has been indicated that the connecting link between the top of the lid and the oven roof is one which may also serve as a handle for the lid, still it will be understood that there will be some occasions when there would be little need to remove the lid from the cooking surface, in which case it might be preferred to have the connecting link more or less permanently fixed to the lid top and the oven. This, however, is a detail which obviously may be varied at will, once the nature of the invention has been made known.

The particular type of pivoted connection at the ends of the link likewise is a matter of detail, it merely being necessary that the connection be sufficiently free in movement and adequately strong to meet normal conditions of use.

While preferred forms of the invention have been disclosed, it is to be understood that I do not intend to be limited thereby but only by the appended claims.

I claim:

1. In combination with a cooking oven, a lid for covering a removable cooking surface, said lid having a handle on its top, one end of said handle being detachably connected thereto and the other end pivotally connected thereto, means at the roof of said oven for making connection with the detached end of said handle when the latter is swung upwardly to the roof of said oven, and means for applying force to the rear of said lid to move the lid outwardly from said oven along with said removable cooking surface, whereby said lid will pivot at its rear end and will swing upwardly at its front end as said link is swung forwardly and upwardly.

2. In combination, a cooking oven, a pan in said oven, a cover for said pan pivotally related thereto at its inner end, means for raising said cover as said pan is withdrawn from said oven, said means comprising a link pivotally connected to the top of said cover forward of the middle thereof and detachably and pivotally connected to the roof of said oven whereby movement of said pan from said oven will progressively raise the outer end of said cover from said pan, and additional means on the top of said cover for connecting thereto the upper end of said link when the link has been detached from the means normally connecting said link to the top of said oven.

3. In combination, a cooking oven and a pan mounted for withdrawal from said oven, a cover for said pan pivotally related thereto at its inner end, a link connecting the top of said cover with said oven, said link comprising a bar curved at one end and hingedly connected with the forward portion of said cover, the other end of said link having a hook-like formation, means connected to the roof of said oven adapted to detachably engage said hook-like portion whereby when said link is connected to said roof, movement of said pan from said oven will cause said cover to be raised from said pan, and means on said cover adapted to engage said hook-like formation when said bar has been disengaged from said oven roof.

4. In combination, a cooking oven, a pan movable in and out of said oven, a cover for said pan pivotally related thereto at its inner end, a link for connecting said cover to the top of said oven, said link comprising a rigid bar curved at one end and pivotally related to the forward part of said cover, the other end of said bar having means thereon adapted to be detachably and pivotally engaged by means fixed to the top of said oven, a clip on said top adapted to secure the detachable upper end of said bar to said top to provide a lifting handle for said cover when said bar is disengaged from the connecting means at the top of the oven, the extent of the curvature of said bar being sufficient to provide adequate finger space between said bar and said cover when said bar is held by said clip.

5. An automatically opening lid for use with a cooking surface in an oven, comprising a support withdrawable from said oven, a cooking surface carried by said support, a lid normally positioned over said cooking surface, means for permitting said lid to pivot with respect to said cooking surface at the inner end of said lid, a link connected at its lower end to said lid at a point forward of said pivotal means and detachably connected to the roof of said oven at its upper end at a point spaced inwardly from the front of said oven, the length of said link being greater than the distance from the point of connection with the roof of said oven to the front of said oven, and additional means for detachably connecting the upper end of said link to said lid between said lower end connection and said pivotal means, whereby, when said support and cooking surface are withdrawn from said oven, the front end of said lid will be swung upwardly and its movement limited by engagement of said link with said oven roof, and when said link is detached from said roof and connected to said additional connecting means on said lid, said link will act as a handle for lifting said lid from said cooking surface.

FRANK H. SCHNEIDER.

REFERENCES CITED

The following references are of record in the file of this patent:

UNITED STATES PATENTS

| Number | Name | Date |
|---|---|---|
| 1,808,357 | Kole | June 2, 1931 |
| 302,469 | Cook | July 22, 1884 |
| 288,924 | Cook | Nov. 20, 1883 |
| 2,233,796 | Pines | Mar. 4, 1941 |
| 2,247,232 | Goldberg | June 24, 1941 |